I. B. MAHON.
Cultivator.
No. 110,257.
Patented Dec. 20, 1870.
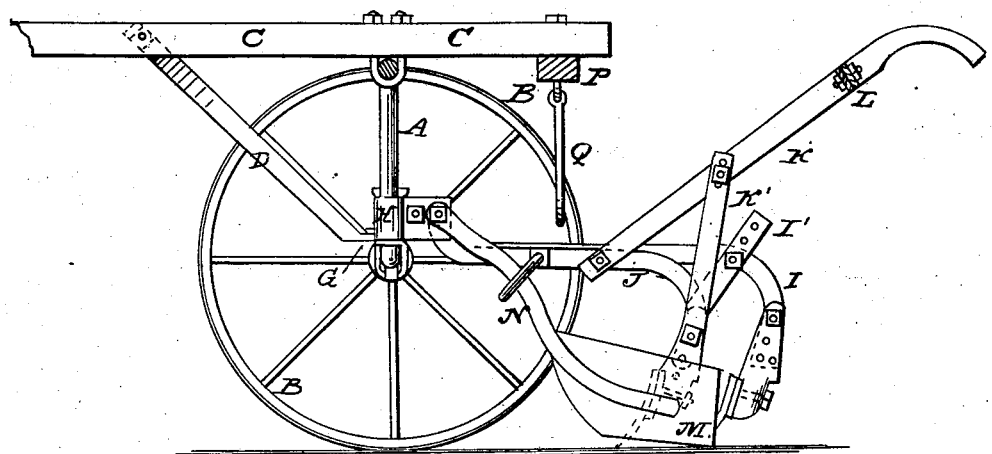
Fig. 1.
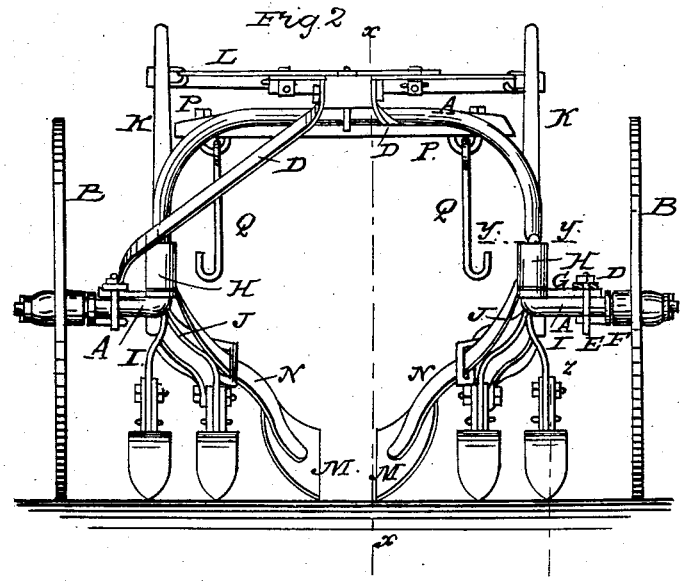
Fig. 2.
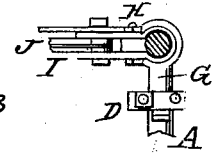
Fig. 3.
Fig. 4.

UNITED STATES PATENT OFFICE.

ISAAC B. MAHON, OF DUNKIRK, OHIO.

IMPROVEMENT IN CULTIVATORS.

Specification forming part of Letters Patent No. 110,257, dated December 20, 1870; antedated December 15, 1870.

*To all whom it may concern:*

Be it known that I, ISAAC B. MAHON, of Dunkirk, in the county of Hardin and State of Ohio, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved cultivator, taken through the line *x x*, Fig. 2. Fig. 2 is a front view of the same, part being broken away to show the construction. Fig. 3 is a detail sectional view of the same, taken through the line *y y*, Fig. 2. Fig. 4 is a detail sectional view of the same, taken through the line *z z*, Fig. 2.

Similar letters of reference indicate corresponding parts.

My invention has for its object to furnish an improved cultivator which shall be so constructed that the plow-beams may have a free lateral movement for convenience in cultivating crooked rows or avoiding irregular hills, and which shall at the same time be strong and durable; and it consists in the construction and combination of various parts, as hereinafter more fully described.

A is the axle, which may be made of round, square, or flat iron, as may be desired. The middle part of the axle A is curved, as shown in Fig. 2, and its end parts are bent outward at right angles to form spindles or journals for the wheels B.

C is the tongue, which is secured in the middle part of the axle A by staple and nuts, hook-bolts, or other suitable clamps.

D are braces, the upper or forward ends of which are bolted to the tongue C, and the lower ends of which rest upon the horizontal parts of the axle A, between its angles and the hubs of the wheels B, where they are secured in place by the clips E, which pass around said axle through the bars D, and are secured in place by nuts. The hubs of the wheels B are kept in place upon the axle A and protected from dirt by washers F, which are made with arms extending along the under side of the horizontal part of the axle A, and around which the clip E passes.

G are washers placed upon the vertical parts of the axle A, and which are made with arms projecting along the upper sides of the horizontal parts of the axle A, and upon which the ends of the braces D rest. The ends of the arms of the washers F and G are bent outward, to prevent the braces D and clips E from working out of place.

H are clamps placed and working freely upon the vertical parts of the axle A, and to which the forward ends of the plow-beams I J are pivoted, so that the plows may have a free lateral and vertical movement, as may be required. The clamps H rest upon the washers G, and are kept from working upward by stop-pins passing through the said axle above the said clamps.

K are the handles, the forward ends of which are attached to the plow-beams, and the rear parts of which are supported by braces *k'*, extending down to said beams. The upper ends of the handles K are adjustably coupled to each other by the coupling L, which consists of two bars, which overlap and are secured to each other by bolts passing through slots or oblong holes in the bodies of said bars. The outer ends of the bars of the coupling L have holes or eyes formed through them, to receive the hooks of the hook-bolts, by which the said bars are connected and pivoted to the said handles K. This coupling securely and flexibly connects the handles K, and at the same time allows the handles, and consequently the plows, to be adjusted farther apart or closer together, as may be required.

M are shields, which are attached to the rear ends of the bars N, which pass forward through the guides O, attached to the inner plow-beams, J, and the forward ends of which are secured to the clamps H by the same bolts that the plow-beams I J are secured by, so that the said shields may be conveniently detached when desired.

I' is a curved connecting-bar, which holds the beams I J firmly together, so that they may move simultaneously in any lateral movement of the plows. It has several perforations at either end, to admit of placing the shovel or shares at the same height or changing their relative height. The rear end of the tongue C projects in the rear of the axle A, and has a cross-bar, P, attached to its rear end.

Q are stirrups or rods, upon the lower ends of which are formed hooks, upon which may be hooked the plow-beams I J to hold the plows away from the ground when turning, or when passing from place to place. The upper ends of the stirrups or hooked rods Q have holes or eyes formed in them, through which passes the hooks of the hook-bolts, by which the said rods Q are pivoted to the ends of the cross-bar P, as shown in Figs. 1 and 2.

Having thus described my invention, I claim as new and desire to secure by Letters Patent—

1. The combination of clip E and washers G F with braces D D and wheels B B, as and for the purpose described.

2. The curved connecting-bar I', perforated as set forth, combined with a pair of pivoted cultivator-beams, I J, for the purpose of rendering the latter susceptible of adjustment with respect to each other in a vertical direction.

ISAAC B. MAHON.

Witnesses:
E. F. SHUER,
CHARLES MAHON.